3,809,549
ACID LEACHING OF LATERITIC ORE
Vaclav Opratko, 2501 Homelands Drive, Clarkson, Ontario, Canada; James Alexander Evert Bell, 45 Victoria St., Port Colborne, Ontario, Canada; and Roberto Vincenzo Ferrajuolo, 2235 Hurontario St., Cooksville, Ontario, Canada
No Drawing. Filed June 21, 1971, Ser. No. 155,326
Claims priority, application Canada, July 8, 1970, 87,699
Int. Cl. C22b 23/04
U.S. Cl. 75—101 R
11 Claims

ABSTRACT OF THE DISCLOSURE

Nickel values are acid leached from nickeliferous oxide ores by forming an aqueous slurry of ore and pyrites in an autoclave and oxidizing the pyrites at a temperature between about 200° C. and 260° C. to provide a sulfuric acid solution for selectively leaching the nickel values contained in the nickeliferous oxide ore without encountering undue scale formation on the autoclave walls and in auxiliary equipment. Advantageously, the slurry is heated to a temperature above about 250° C. after the leaching reaction is complete to facilitate subsequent liquid-solid separation. Dissolved nickel and cobalt values can be recovered by conventional techniques, such as hydrogen sulfide precipitation.

---

The present invention pertains to the hydrometallurgy of nickel, and more particularly to the hydrometallurgical treatment of nickeliferous oxide ores.

Nickel values in nickeliferous oxide ores, such as laterites, are highly dispersed throughout the ore and are not present as a separate and distinct mineralogical phase but are substituted for other elements in the crystal lattice. Because the nickel values are not present as a separate and distinct phase, the ore cannot be beneficiated to produce a concentrate rich in nickel values. Thus, even though the concentration of nickel values in lateritic ores may be comparable to that in sulfide ores, the inability to beneficiate lateritic ores necessitates treatment of the entire mass of the core.

Nickeliferous lateritic ores can be broadly classified as silicate or limonitic. Limonitic ore is a highly weathered ore whereas silicate ores are less weathered. The weahering process concentrates nickel values in the limonitic fraction. In most instances, lateritic ores are mixtures of limonite and silicate fractions. The limonitic fractions are characterized by high iron contents (e.g., up to about 50% or more) and moisture contents (e.g., up to about 40%) and comparatively low magnesia and alumina contents. Silicate ores, on the other hand, are characterized by low iron contents (as low as 7% or lower) and higher magnesia and alumina contents.

Lateritic ores containing nickel have been treated pyrometallurgically to recover ferronickel or ferronickel matte or pyrometallurgically in conjunction with vapometallurgical techniques to recover nickel as nickel carbonyl. These approaches are suitable for specific ores, particularly ores containing above about 2% nickel, but are not entirely satisfactory because large amounts of fuel are consumed in heating the mass of the ore which is predominantly gangue.

It has also been suggested to selectively reduce nickel-bearing lateritic ores and to then leach selectively reduced nickel values therefrom. Ammonia or acid lixiviants have been suggested, depending chiefly upon the nature of the ore, i.e., whether the ore is limonitic or silicate. Ores with high magnesia contents are preferably leached with ammoniacal solutions while limonitic ores are leached with either acid or ammoniacal solutions with reagent cost being the paramount consideration. Silicate ores treated in accordance with these procedures are selectively reduced at high temperatures to insure that the nickel values are reduced and that the magnesia contents are rendered less soluble. Higher reduction temperatures increase the cost of the selective reduction operation and, thus, the overall cost of the recovery of nickel from the ore. Limonitic ores do not require as high reduction temperatures but large quantities of fuel are expended merely in drying the ore before it can be selectively reduced.

Those processes involving selective reduction of limonitic ores in conjunction with aeration and acidic leaching proceed on the theory that selectively reduced nickel values are preferentially and rapidly dissolved in aerated acidic solutions while the oxidizing conditions during leaching retard dissolution of the incompletely reduced iron values. These processes also take advantages of the fact that most metal sulfates, particularly ferric sulfate, dispaly only limited solubility at elevated temperatures.

Another process, which relies on the limited solubility of ferric sulfate when treating limonitic ores and which has been practiced on an industrial scale, involves leaching limonitic ore, without any prior treatment except crushing and screening, if required, with sulfuric acid at temperatures above 200° C. to selectively dissolve nickel and cobalt values. This process provides good nickel and cobalt extractions while minimizing the dissolution of iron. However, the same mechanism that minimizes the iron content of the pregnant solution also operates to enhance scale formation upon the walls of the reactor and of auxiliary equipment employed to handle the pregnant solution. The high temperature required to limit ferric sulfate solubility also limits the solubility of aluminum sulfate, among other ingredients, and the precipitated aluminum sulfate forms a hard scale akin to boiler scale on the reactor walls and in auxiliary piping, etc. Processing must be eventually terminated and the reactor walls scraped. The nature of the scale buildup on equipment walls promotes further scale formation, with the result that the intervals between scraping become shorter and shorter, and the process becomes less and less economically attractive. Thus, not only is production time lost during scale removal, but the scale removal operation itself is tedious, time-consuming and expensive. Although many attempts were made to overcome the foregoing difficulties and other problems encountered in leaching nickel-bearing lateritic ores, none, as far as we are aware, was entirely successful when carried into practice commercially on an industrial scale.

It has now been discovered that nickeliferous oxide ores can be effectively and efficiently leached with acidic sulfate solutions without prior treatment while minimizing scale formation in the leaching vessel by specially preparing the leaching solution and by controlling the leaching conditions to selectively leach nickel and cobalt values and to render the residue more suitable for solid-liquid separation.

It is an object of the present invention to selectively leach nickel and cobalt values from lateritic ores without requiring a preliminary treatment.

Another object of the present invention is to economically generate in situ a leaching solution that selectively dissolves nickel and cobalt values from nickeliferous oxide ores.

A further object of the present invention is to provide a process which can be utilized in remote locations.

Still another object of the present invention is to provide a process in which problems associated with scaling are minimized.

An even further object of the present invention is to provide an acid leaching process for recovering nickel and cobalt values from nickeliferous oxide ores in which required heat is autogenously generated.

Yet another object of the present invention is to provide a process for leaching nickel and cobalt values from oxide ores with acidic sulfate solutions and for increasing the settling rate of the leached ore.

Other objects and advantages will become apparent from the following description.

Generally speaking, the present invention provides a hydrometallurgical process for recovering nickel and cobalt values from nickeliferous oxide ores. The process comprises forming a slurry of water containing up to about 50 grams per liter (g.p.l.) dissolved sulfate, pyrites and nickeliferous oxide ore in a pressure vessel and heating the slurry to a temperature above 200° C. The heated slurry is treated with oxygen at a partial pressure of at least about 1.5 atmospheres absolute to oxidize the pyrites to establish and maintain a sulfuric acid solution that selectively leaches nickel and cobalt values from the ore while minimizing scale formation in the pressure vessel.

Although all nickeliferous oxide ores can be treated in accordance with the process of the present invention, it is advantageous to treat the limonitic fraction of nickeliferous-containing lateritic ores. For the purposes of the present invention, the terms "limonitic" or "limonite" refer to nickeliferous oxide ores containing at least about 35% iron, and advantageously at least about 45% iron. The limonitic fractions of lateritic ores contain, in addition to iron, between about 1% and 2% nickel, up to about 0.15% cobalt, less than about 10% magnesia, up to about 7% alumina, less than about 15% silica and moisture in amounts up to about 50%. Advantageously, nickeliferous limonitic ores containing less than about 5% magnesia and less than about 7% alumina are treated in accordance with the process of the present invention. Although ores containing greater amounts of magnesia and alumina can be processed, the increased quantities of magnesia and alumina consume large quantities of sulfuric acid, increasing the amount of pyrites that must be employed. It is to be noted that all compositions recited herein are given on a weight basis, unless otherwise stated.

Nickel-containing limonitic ores, as mined, are usually sufficiently fine so that no crushing or grinding is required before they are treated in accordance with the process of the present invention. As an example, as mined nickel-containing lateritic ore can be over 80% minus 325 mesh (Tyler Screen Size) and only about 10% plus 20 mesh. For kinetic reasons, the ore is comminuted to about 50% minus 200 mesh and advantageously about 80% minus 325 mesh.

Limonitic ores (ores having high iron contents) are the highly weathered products of serpentine with nickel values concentrated therein, whereas the silicate fraction is the less weathered portion of serpentine and contains greater amounts of acid soluble ingredients, including alumina and magnesia, and lesser amounts of nickel. The weathering process involves the dissolution and precipitation by and from percolating acidulated ground waters. The nature of the weathering process is such that the weathered limonitic product has a much finer particle size than the less weathered silicate fraction, and the limonitic and silicate fractions can be frequently separated by mere screening. Since lateritic ores can contain up to about 40% or more moisture, wet screening techniques are employed to avoid intervening drying operations. In separating silicate fractions from nickel-containing lateritic ores, it is advantageous to employ a 20 mesh screen for this purpose. Screening with a 20 mesh screen is effective in eliminating the silicate fraction and alleviating materials-handling problems while minimizing nickel losses in the discarded silicate fraction. As an example, wet screening of a nickeliferous lateritic ore provided a silicate fraction of about 10% of the total weight of the ore which contained only about 3% of the total nickel values. Wet screening can be accomplished after nickeliferous ore is slurried with water as desribed hereinafter.

The nickeliferous oxide ore, crushed or screened, if desired, is formed into an aqueous slurry containing between about 15% and 40% solids and advantageously between about 30% and 40% solids. If the ore is transported to the plant from the mining site as a dilute aqueous slurry, excess water can be removed by conventional slurry thickeners. Although slurries containing greater or lesser amounts of solids can be employed, it is advantageous to form slurries within the aforestated ranges in order to minimize materials-handling problems (dilute slurries require an excess of equipment while concentrated slurries are less stable), to minimize the required pyrite addition and for temperature control, as described hereinafter. As used herein, the slurries content of aqueous slurries includes that part of the solids contributed by the pyrite addition. For example, an aqueous slurry of 40% solids can contain 37% ore solids and 3% pyrite solids.

An important feature of the present invention is the use of pyrites to generate the leaching solution in situ. Any naturally occurring or synthetic iron sulfide, e.g., pyrrhotite and, advantageously nickel and cobalt-containing pyrrhotite, can be employed. In addition, sulfur from other sources, such as sulfur dioxide and elemental sulfur, can be employed. However, most nickeliferous laterites are found in remote locations where the cost of shipping becomes a major concern; and pyrites contain more sulfur per unit weight than all other iron sulfides and even contain more sulfur than sulfuric acid so that substantial cost savings are realized due to lower shipping costs and the lower cost of the reagent itself. In addition to cost factors, the use of pyrites is even more important insofar as overall process efficiency is involved as described hereinafter.

Pyrites are added to the slurry in amounts equivalent to from about 8% to 30%, based on the weight of the ore, and advantageously, in amounts equivalent to from about 12.5% to about 25% to insure maximum nickel recovery while insuring efficient pyrite utilization. In order to provide efficient pyrite oxidation and, therefore, effective nickel extraction, the pyrites are comminuted by crushing and/or grinding to at least about 100% minus 100 mesh, and advantageously to at least about 80% minus 200 mesh. Control of pyrite particle size within the foregoing ranges provides efficient chemical processing without encountering undue materials handling problems.

Pyrite oxidation to generate a leaching solution in situ is an important feature of the present invention. Pyrites are ultimately oxidized to iron oxide and sulfuric acid. The overall chemical reactions involved in pyrite oxidation are exothermic, so that, in most instances, heat does not have to be added from extraneous sources. More importantly as described hereinafter, leaching solutions generated in situ by the oxidation of pyrites display highly selective dissolving power.

An important feature of the present invention is the oxidation of pyrites to produce a highly selective lixiviant and to provide sufficient heat for the purpose of establishing commercially attractive leaching rates. The rate of pyrite oxidation is proportional to a number of factors, including temperature, pyrite particle size, slurry density and oxygen partial pressure. In order to achieve commercially attractive oxidation rates, it is advantageous to treat the ore-pyrite slurry with oxygen partial pressures of at least about 1.5 atmospheres absolute, and even more advantageously oxygen partial pressures of more than about 3.5 atmospheres absolute. Theoretically, there is no maximum oxygen partial pressure, and only apparatus requirements place an upper limit on the oxygen partial pressure. Having regard to apparatus cost and materials handling, however, a practical upper limit is about 7.0 atmospheres.

The required oxygen partial pressure can be established by the introduction of air or pure oxygen to the pressure vessel. Of course, the use of air, which contains only 21% oxygen, increases the weight of the autoclave that must be used in establishing a particular oxygen partial pressure. Therefore, it is advantageous, in most instances, to employ pure or commercially pure oxygen.

Rapid reaction rates, including pyrite oxidation and leaching, are insured by providing good gas-liquid-solid contact. Good gas-liquid contact is particularly important since pyrite oxidation will come to a halt when the aqueous slurry becomes oxygen starved. Mechanical means, such as impellers, can be employed to sufficiently agitate the aqueous slurry to provide good liquid-solid contact as well as insuring good gas-liquid contact. Alternatively, the oxidizing gas can be passed through the slurry to pneumatically agitate the slurry while providing excellent gas-liquid-solid contact.

As noted hereinbefore, the rate of pyrite oxidation is proportional to the reaction temperature with higher temperatures providing faster reaction rates. Higher temperatures are also effective in controlling the iron content of the solution which is a highly important consideration since reagent costs can be drastically lowered by controlling iron dissolution. From the standpoint of attractive reaction rates and iron dissolution control, it is advantageous to maintain the aqueous slurry at a temperature between about 200° C. and 260° C., and advantageously, between about 240° C. and 260° C. Lower temperatures can be employed, but lower reaction rates and greater consumption of reagents are encountered. Higher temperatures can be employed, but heavier apparatus must be provided to compensate for the increased steam pressures at such higher temperatures. Pyrite oxidation is exothermic; and, in most instances, the addition of external heat is not required to maintain the slurry at the aforementioned temperatures, except for starting up when it is advantageous to initiate and propagate pyrite oxidation at commercially feasible rates. Once pyrite oxidation is initiated and propagated at industrially practical rates, provisions for cooling, either in the form of cooling coils or by the addition of cooling water, can be made to maintain the slurry at the foregoing temperatures.

Upon completion of the leaching reactions, the pregnant solution must be separated from the hydrated iron oxide, a product of pyrite oxidation, and from the ore residue before recovering the dissolved nickel and cobalt values. The separation of pregnant leach solution from hydrated iron oxide has frequently caused materials handling problems since the physical nature of hydrated iron oxide does not readily lend itself to conventional solid-liquid separation techniques. It has now been found that this problem can be minimized or even avoided by conducting the leaching operation at the aforedescribed temperature range and then, when the leaching reactions are complete, raising the temperature of the slurry to above about 250° C., advantageously to a temperature between about 250° C. and 260° C., for a short time, e.g., over about 30 minutes, either in the same reactor or a second reactor specially designed for this purpose. By raising the temperature of the slurry in the foregoing manner, the settling rate can be increased from about 0.06 to about 0.3 meter per hour, thereby increasing the efficiency of most conventional liquid-solid separation techniques. Of course, if the nature of the ore being treated naturally displays good settling rates, the second stage heating is not required.

An important feature of the present invention is the continuous generation of sulfuric acid during the leaching operation. The continuous generation of acid has numerous advantages. For example, when the process is conducted on a batch basis, the strength of the acidic solution increases as the content of nickel and cobalt values in the ore is lowered by leaching so that the process is conducted in a manner that approaches countercurrent principles. Since the sulfuric acid leaching solution is generated at leaching temperatures, scaling problems attributable to the precipitation or hydrolysis of sulfates, such as calcium and aluminum, that display diminishing solubility with increasing temperatures are minimized because in the absence of acid at lower temperatures solutions of these sulfates are not formed. Additionally, since acid is generated as the leaching reaction proceeds, the pH value of leaching solution is maintained at comparatively high values for a preponderant part of the process thereby minimizing corrosion problems and effectively limiting dissolution of undesirable elements.

Although the presence of excessive amounts of free acid or compounds that are hydrolyzable thereto are undesirable in the initial slurry, the slurry can be formed from an aqueous solution having a sulfate content of less than about 50 g.p.l. without encountering the problems associated with initially high free acid contents. In some instances, it is advantageous to initially have small amounts of free acid to provide a solution that has a pH value between about 1.5 and 3 to initiate pyrite oxidation. For the purpose of initiating pyrite oxidation, controlled amounts of free acid, the pregnant leach solution or the stripped leach solution can be added to the slurry so that the aqueous solution used in forming the slurry contains sulfates in amounts up to about 50 g.p.l., and advantageously up to about only 35 g.p.l. while minimizing problems associated with excessive amounts of free acid being present.

The pregnant leach solution, which contains up to about 8 g.p.l. nickel, up to about 0.8 g.p.l. cobalt, up to about 10 g.p.l. iron (advantageously less than about 4 g.p.l. or even less than about 2 g.p.l. iron), and sulfuric acid in amounts up to about 50 g.p.l., is treated with a calcium-containing base, such as lime or coral, to adjust the pH value of the solution to between about 2.5 and 3 and to precipitate some iron and is then treated with hydrogen sulfide at elevated temperatures and pressures to selectively precipitate sulfides of nickel and cobalt, and copper. The precipitated sulfides can be redissolved by oxidation leaching in an aqueous acidic solution to provide a solution concentrated in nickel and cobalt values which can be separated and treated to recover the individual metal values. For example, the concentrated solution can be treated with a base or nickel-complexing compound, such as monoethanolamine or ammonia, and then carbonylated to produce substantially pure nickel carbonyl as described in Canadian patent application Ser. No. 47,061, filed Mar. 27, 1969 and assigned to the assignee of the present application, now Canadian Pat. No. 896,840, issued Apr 4, 1972.

For the purpose of giving those skilled in the art a better understanding of the invention, the following illustrative example is given:

EXAMPLE I

A nickeliferous limonitic lateritic ore containing 1.57% nickel, 0.15% cobalt, 48% iron, 1% magnesia, 5.4% alumina, 4.1% silica and the balance essentially moisture is transported from the mine as an aqueous slurry containing 20% solids which solids are minus 20 mesh. The ore slurry is transported to ore slurry thickeners to produce a slurry containing 37% solids. The thickened slurry is conveyed to slurry storage where 13.5 weight percent pyrites per dry weight of ore are added to form an ore-pyrite slurry.

The ore-pyrite slurry is transferred to a suitable autoclave where the slurry is heated to a temperature of about 240° C. under an oxygen partial pressure of 7 atmospheres which is maintained by the addition of commercial oxygen and under a total pressure of 41 atmospheres for one hour. The ore-pyrite slurry is mechanically agitated by rotating impellers to maintain good solid-liquid contact which agitation is also sufficient to insure that oxygen is introduced into the aqueous slurry at a rate sufficient to maintain the reaction. Aqueous oxidation of the pyrites produces a sulfuric acid solution that selectively dissolves nickel and cobalt values. After the leaching is completed up to 95% of the nickel is dissolved and the free acid content of the solution is 40 g.p.l.

After the leaching operation the slurry is diluted and transferred to a solid-liquid separation and washing operation, which can be a multistage countercurrent decantation system, e.g., a six-stage countercurrent decantation system, to provide a waste slurry containing 40% solids and a pregnant solution containing 4.3 g.p.l. nickel, 0.37 g.p.l. cobalt, 1.35 g.p.l. iron, and 0.03 g.p.l. copper, which pregnant solution has a pH value above 1.

The pregnant solution is then partially neutralized by the addition of coral to raise the pH value of the solution to 3 and to precipitate some iron and calcium sulfate in amounts substantially equivalent to the amount of free acid. The precipitate can be recycled to the multistage solid-liquid separation for more complete separation and to recover precipitated nickel values due to the addition of excessive amounts of coral.

The neutralized solution is treated with hydrogen sulfide to precipitate nickel and cobalt sulfides. Precipitated cobalt and nickel sulfides are separated from the solution for further treatment while the solution is discarded.

EXAMPLE II

Unground New Caledonia ore, containing 1.50% nickel, 0.14% cobalt, 44.0% iron and 38.5% moisture, was slurried with water and wet screened at 20 mesh. Pyrites in an amount of 12.5% by weight of dry ore were added and the resulting 40% solids slurry was transferred to a 2000 ml. Parr reactor. The autoclave was heated to 240° C. and an oxygen overpressure of about 7 atmospheres was maintained, resulting in a total pressure of 42 atmospheres gauge. After about 20 minutes, 50% nickel was extracted from the ore while the free acid content had not risen above 20 g.p.l., and 96% nickel and 85% cobalt were extracted within one hour. A scale deposit on the walls of the autoclave of only 0.02% by weight of charge was noticed.

EXAMPLE III

The same ore as in Example II was slurried with water and wet screened at 20 mesh. Sulfuric acid in amount of 20.4% by weight of ore (equivalent to 12.5% pyrite) was added and the resulting 40% solids slurry was leached for one hour at 240° C. and 34 atmospheres gauge of steam pressure. About 96% nickel was extracted and 1.2% of scale by weight of charge was noticed. This example confirms that scale formation is promoted by large initial free acid contents.

EXAMPLE IV

Unground New Caledonia ore containing 1.46% nickel, 0.068% cobalt, 44% iron, 4.0% magnesia, 4.9% alumina, 7.5% silica, 0.9% calcium oxide and the balance essentially moisture was slurried with water, and wet screened at 20 mesh. An aqueous slurry containing 140 kilograms (dry weight) minus 20 mesh ore at 37% solids by weight was blended with 22.5 dry kilograms of pyrite to give 390 liters of slurry at 40% solids. The blended slurry was transferred to a 570 liter mechanically agitated autoclave and heated by live steam addition to 182° C., giving a 32% solids slurry.

An oxygen atmosphere at a partial pressure of about 27 atmospheres gauge was introduced, resulting in a total pressure of 37 atmospheres gauge. Temperature rose autogenously, due to pyrite-oxygen reaction, to 240° C., and a constant total pressure of 37 atmospheres was maintained by oxygen addition. Temperature was then increased over a 0.75 hour period to 252° C. by steam addition, still maintaining 37 atmospheres total pressure by controlling the oxygen partial pressure. At the end of this period, with steam pressure equal to total pressure at 37 atmospheres, oxygen was shut off. Nickel extraction at this time was 95%, and tailings settling rate on a slurry sample diluted to 15% solids to simulate countercurrent decantation conditions was 0.21 meter per hour.

Temperature was maintained at 252° C. by live steam addition for a further one hour, after which the resulting 460 liters of slurry at 24% solids was cooled by venting to atmosphere to 100° C., giving 278 liters of final slurry at 36% solids. Nickel extraction had increased to 96%, with cobalt extraction at 89.5%. Pregnant solution and ore tailings analyzed as follows:

|  | Ni | Co | Fe | $H_2SO_4$ | pH |
|---|---|---|---|---|---|
| Pregnant solution, g.p.l. | 9.20 | 0.420 | 8.10 | 39.7 | 0.4 |
| Tailing, percent | 0.080 | 0.006 | 58.5 | | |

After the leaching operation the slurry containing 35% solids was transferred to a countercurrent decantation circuit consisting of six stages. The overall recovery of nickel and cobalt values from the countercurrent washing of tailings was 98%.

Two thousand liters of accumulated pregnant solution recovered from several leaching operations was then treated with hydrated lime to raise the pH of the solution to 2.5, requiring about 15 kg. of hydrated lime per 1000 liters of solution. The resulting gypsum and some ferric hydroxide precipitate from the neutralization reaction was discarded after solid-liquid separation. This precipitate would ordinarily be recycled to head of the countercurrent decantation circuit to recover any nickel values from this.

After separation, 150 liters of the neutralized pregnant solution containing 4.40 g.p.l. nickel, 0.22 g.p.l. cobalt, 0.057 g.p.l. copper, 6.30 g.p.l. iron, 1.20 g.p.l. magnesium, 1.30 g.p.l. manganese, 0.43 g.p.l. chromium, 0.27 g.p.l. zinc, 0.66 g.p.l. calcium, 1.72 g.p.l. aluminum and 0.19 g.p.l. silicon was treated with hydrogen sulfide at 130° C. and 10.5 kg./cm.² gauge pressure for a 30 minute rentention time to selectively precipitate sulfides of nickel, cobalt and copper. Precipitations using the above solution and operating conditions were done with 200% recycle sulfide precipitate obtained from previous runs resulting in greatly improved particle size. 99% of the nickel, 98% of the cobalt and almost all of the copper was recovered from the pregnant solution. Typical analyses of barren solution and sulfide cake are as follows:

Barren solution:
```
Cu ----------------------------------g.p.l.-- Trace
Ni ----------------------------------g.p.l.-- 0.025
Co ----------------------------------g.p.l.-- 0.003
Fe ----------------------------------g.p.l.-- 6.0
pH ---------------------------------- 1.2
Mg ----------------------------------g.p.l.-- 1.44
Mn ----------------------------------g.p.l.-- 1.52
Cr ----------------------------------g.p.l.-- 1.21
Zn ----------------------------------g.p.l.-- 0.09
Ca ----------------------------------g.p.l.-- 0.57
Al ----------------------------------g.p.l.-- 2.26
Si ----------------------------------g.p.l.-- 0.17
```

Sulfide cake (percent):
```
Cu ---------------------------------------- 0.84
Ni ---------------------------------------- 55.0
Co ---------------------------------------- 2.86
Fe ---------------------------------------- 0.50
S ----------------------------------------- 37.6
Zn ---------------------------------------- 1.70
Pb ---------------------------------------- 0.005
$Cr_2O_3$ ---------------------------------------- 0.36
$Al_2O_3$ ---------------------------------------- 0.33
$SiO_2$ ---------------------------------------- 0.04
CaO ---------------------------------------- <0.01
MgO ---------------------------------------- <0.01
MnO ---------------------------------------- Trace
```

Although the present invention has been described in conjunction with preferred embodiments, it is to be understood that modifications and variations may be resorted to without departing from the spirit and scope of the invention, as those skilled in the art will readily understand. For example, sea water can be employed to form the aqueous slurry of ore and pyrites. Such modifications and variations are considered to be within the purview and scope of the invention and appended claims.

We claim:

1. The hydrometallurgical process for recovering nickel and cobalt values from nickeliferous oxide ores which contain between about 1% and 2% nickel, up to about 0.15% cobalt, at least about 35% iron, less than about 10% magnesia, less than about 7% alumina, less than about 15% silica and the balance essentially moisture which comprises: forming a slurry of water containing up to about 50 grams per liter dissolved sulfate, nickeliferous oxide ore and pyrites in an amount equivalent to between about 8% and 30%, based on the weight of the ore, in a pressure vessel, heating the slurry to a temperature above 200° C. and treating the heated slurry with oxygen at a partial pressure of at least about 1.5 atmospheres absolute to oxidize pyrites to establish and maintain a sulfuric acid solution that selectively leaches nickel and cobalt values from the ore while minimizing both scale formation in the pressure vessel and iron dissolution.

2. The process as described in claim 1 wherein as mined ore is wet screened with a 20 mesh screen and only the minus 20 mesh fraction is hydrometallurgically treated to recover nickel values contained therein.

3. The process as described in claim 1 wherein the slurry contains between about 15% and 40% solids.

4. The process as described in claim 3 wherein the slurry contains between about 30% and 40% solids.

5. The process as described in claim 3 wherein pyrites are added to the slurry in amounts equivalent to from about 12.5% to 25% based on the weight of the ore.

6. The process as described in claim 3 wherein the pyrites are comminuted to 100% minus 100 mesh.

7. The process as described in claim 3 wherein the oxygen partial pressure is maintained between about 3.5 atmospheres and 7 atmospheres.

8. The process as described in claim 7 wherein the oxygen partial pressure is established by the addition of commercially pure oxygen.

9. The process as described in claim 7 wherein the slurry is maintained at a temperature between about 200° C. and 260° C.

10. The process as described in claim 7 wherein the slurry is heated to a temperature between about 250° C. and 260° C. after the leaching reaction is completed to increase the efficiency of subsequent liquid-solid separation operations.

11. The process as described in claim 7 wherein sea water is employed in establishing the aqueous slurry of ore and pyrites.

References Cited

UNITED STATES PATENTS

| | | | |
|---|---|---|---|
| 2,718,455 | 9/1955 | McCormick | 75—101 R X R |
| 2,971,835 | 2/1961 | Matson | 75—115 |
| 3,130,043 | 4/1964 | Lichty | 75—101 R X R |
| 3,141,764 | 7/1964 | Matsuzuka et al. | 75—101 R X R |
| 3,293,027 | 12/1966 | Mackin et al. | 75—119 |

FOREIGN PATENTS 256,264   10/1970   U.S.S.R.

OTHER REFERENCES

Central Patents Index, Basic Abstracts Journal Week R38, issue date Jan. 1, 1971.

EDWARD STERN, Primary Examiner

U.S. Cl. X.R.

75—119, 115; 423—544

«O-1050
(5/69)

UNITED STATES PATENT OFFICE
CERTIFICATE OF CORRECTION

Patent No. 3,809,549  Dated May 7, 1974

Inventor(s) Vaclav Opratko, James Alexander Bell and Roberto Ferrajuolo

It is certified that error appears in the above-identified patent and that said Letters Patent are hereby corrected as shown below:

In the heading, insert --Assignee: The International Nickel Company, Inc., New York, N.Y.--

Column 1, line 43, for "core" read --ore--.

Column 2, line 18, for "advantages" read --advantage--.

Column 7, line 41, after "only" insert --about--.

Signed and sealed this 5th day of November 1974.

(SEAL)
Attest:

McCOY M. GIBSON JR.
Attesting Officer

C. MARSHALL DANN
Commissioner of Patents